(12) United States Patent
Birnbaum

(10) Patent No.: US 9,921,655 B2
(45) Date of Patent: Mar. 20, 2018

(54) INTERACTIVE APPLICATION WITH HAPTIC FEEDBACK

(71) Applicant: Immersion Corporation, San Jose, CA (US)

(72) Inventor: David M. Birnbaum, Oakland, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/186,688

(22) Filed: Jun. 20, 2016

(65) Prior Publication Data

US 2017/0168573 A1    Jun. 15, 2017

Related U.S. Application Data

(63) Continuation of application No. 13/954,398, filed on Jul. 30, 2013, now Pat. No. 9,373,233, which is a
(Continued)

(51) Int. Cl.
*G06F 3/01* (2006.01)
*A63F 13/285* (2014.01)
(Continued)

(52) U.S. Cl.
CPC .............. *G06F 3/016* (2013.01); *A63F 13/10* (2013.01); *A63F 13/12* (2013.01); *A63F 13/214* (2014.09);
(Continued)

(58) Field of Classification Search
CPC combination set(s) only.
See application file for complete search history.

(56) References Cited

U.S. PATENT DOCUMENTS

| 4,906,192 A | 3/1990 | Smithard et al. |
| 2005/0212760 A1 | 9/2005 | Marvit et al. |

(Continued)

FOREIGN PATENT DOCUMENTS

| CN | 1578964 | 2/2005 |
| CN | 101118469 | 2/2008 |

(Continued)

OTHER PUBLICATIONS

Chinese Office Action dated Feb. 3, 2017, issued in CN Application No. 201410816268.2.
(Continued)

*Primary Examiner* — Van Chow
(74) *Attorney, Agent, or Firm* — Medler Ferro Woodhouse & Mills PLLC

(57) ABSTRACT

A system and computer-implemented method of providing haptic effects to a first user of a multi-user application. The method includes executing a first instance of the multi-user application on a first computing platform associated with the first user. The multi-user application is configured to interface with an object based on control inputs received from the first user and based on control inputs received from a second user via a second computing platform executing a second instance of the multi-user application, and responsive to performance of a first control input by the second user on the second computing platform, the method includes generating a first haptic effect for the first user on the first computing platform, the first haptic effect conveying information to the first user about the effect of the first control input.

20 Claims, 7 Drawing Sheets

Related U.S. Application Data continuation of application No. 12/841,027, filed on Jul. 21, 2010, now Pat. No. 8,502,651.

(60) Provisional application No. 61/227,645, filed on Jul. 22, 2009.

(51) Int. Cl.

| | |
|---|---|
| *A63F 13/28* | (2014.01) |
| *A63F 13/40* | (2014.01) |
| *A63F 13/30* | (2014.01) |
| *G06F 3/0488* | (2013.01) |
| *G08B 6/00* | (2006.01) |
| *G06F 3/0482* | (2013.01) |
| *G06F 3/0484* | (2013.01) |
| *A63F 13/214* | (2014.01) |
| *A63F 13/92* | (2014.01) |
| *G06F 3/041* | (2006.01) |

(52) U.S. Cl.
CPC ............ *A63F 13/28* (2014.09); *A63F 13/285* (2014.09); *A63F 13/92* (2014.09); *G06F 3/0416* (2013.01); *G06F 3/0482* (2013.01); *G06F 3/04842* (2013.01); *G06F 3/04883* (2013.01); *G08B 6/00* (2013.01); *A63F 2300/1037* (2013.01); *A63F 2300/1075* (2013.01); *A63F 2300/204* (2013.01); *A63F 2300/575* (2013.01); *G06F 2203/014* (2013.01)

(56) References Cited

U.S. PATENT DOCUMENTS

| | | | |
|---|---|---|---|
| 2005/0245302 | A1 | 11/2005 | Bathiche et al. |
| 2007/0150826 | A1 | 6/2007 | Anzures et al. |
| 2007/0265096 | A1 | 11/2007 | Kouno et al. |
| 2007/0279392 | A1 | 12/2007 | Rosenberg et al. |
| 2008/0024459 | A1 | 1/2008 | Poupyrev et al. |
| 2008/0150905 | A1 | 6/2008 | Grivna et al. |

FOREIGN PATENT DOCUMENTS

| | | |
|---|---|---|
| JP | H09-84957 | 3/1997 |
| JP | H09-164270 | 6/1997 |
| JP | 2000-005445 | 1/2000 |
| JP | 2001-265520 | 9/2001 |
| JP | 2001-352414 | 12/2001 |
| JP | 2003-058321 | 2/2003 |
| JP | 2003-290553 | 10/2003 |
| JP | 2004-290685 | 10/2004 |
| JP | 2005-267080 | 12/2005 |
| JP | 2005-332063 | 12/2005 |
| JP | 2006-068210 | 3/2006 |
| JP | 2007-111190 | 5/2007 |
| JP | 2007-221413 | 8/2007 |
| JP | 2007-301270 | 11/2007 |
| JP | 2009-080720 | 4/2009 |
| JP | 2009-087359 | 4/2009 |
| KR | 10-2009-0058019 | 6/2009 |
| WO | 99/38064 | 7/1999 |
| WO | 2009/071750 | 6/2009 |

OTHER PUBLICATIONS

"International Preliminary Report on Patentability", PCT/US2010/042795, dated Feb. 1, 2012.
"International Search Report and Written Opinion", PCT/US2010/042795, dated Jan. 12, 2011.
"International Search Report and Written Opinion", PCT/US2010/042805, dated Oct. 29, 2010.
"Non-Final Office Action", JP Appl. No. 2014-164332, dated Oct. 14, 2015.
"Non-Final Office Action, Korean Patent Application No. 10-2012-7004529, dated Apr. 22, 2016".
Notice of Last Preliminary Rejection, KR Application No. 10-2012-7004529, dated Oct. 27, 2016.
Non-Final Office Action issued in JP Patent Application No. 2012-521762, dated Mar. 24, 2015.
Non-Final Office Action issued in JP Patent Application No. 2012-521762, dated May 13, 2014.
Non-Final Office Action issued in JP Patent Application No. 2012-521762, dated Apr. 22, 2014.
Notification of First Office Action issued in Chinese Patent Application No. 201080032051.2, dated Feb. 12, 2014.
Notification of First Office Action issued in Chinese Patent Application No. 201080032035.3, dated Apr. 21, 2014.
Notice of Preliminary Rejection issued in Korean Appl. No. 10-2017-7018017, dated Sep. 20, 2017.
Morris, Dan et al., "Haptic Battle Pong: High-Degree-of-Freedom Haptics in a Multiplayer Gaming Environment," Experimental Gameplay Workshop, GDC, vol. 192 (2004).
Notification of Grant for CN Appl. No. 201410816268.2, dated Oct. 24, 2017.

INTERACTIVE APPLICATION WITH HAPTIC FEEDBACK

CROSS-REFERENCE TO RELATED APPLICATIONS

This application is a continuation application of U.S. application Ser. No. 13/954,398, filed Jul. 30, 2013, now U.S. Pat. No. 9,373,233, which is a continuation of U.S. application Ser. No. 12/841,027, filed Jul. 21, 2010, now U.S. Pat. No. 8,502,651, which claims the benefit of U.S. Appl. No. 61/227,645, filed Jul. 22, 2009, each of which is incorporated by reference herein in its entirety.

FIELD OF THE INVENTION

The invention relates generally to the generation of haptic effects in the context of a multi-user application in which a plurality of users interact with one or more objects. The haptic effects convey information related to their own interactions with the one or more objects and/or the interactions of the other users. The haptic effects may convey information about one or more parameters of the object, its travel and/or its operation.

BACKGROUND OF THE INVENTION

Touch-enabled devices continue to gain in popularity. Examples of touch-enabled devices include, but are not limited to, mobile telephones/smartphones, media players, and computers. For instance, a tablet computer may comprise a touch-enabled display with the remaining components of the computer in the same housing as the display. Such device may include few or no physical keys.

Haptic effect delivery mechanisms use one or more actuators to provide a physical sensation to a user. Methods of designing haptic effects can be used to determine one or more suitable signals to send to actuator(s) to simulate different physical events or states. Although basic haptic effects (e.g., vibrate) have been used in mobile and other computing devices, numerous challenges remain for developers to engage users and provide feedback to enhance the user experience.

SUMMARY OF THE INVENTION

One aspect of the invention relates to a system and method for providing a game on one or more portable computing device in which a virtual object (e.g., a ball) travels through views of the game displayed on the interfaces of the one or more portable computing devices. Haptic effects corresponding to the travel of the virtual object (or virtual objects) through the views are provided on the individual portable computing devices. The haptic effects may be determined based on one or more parameters of the travel of the virtual object (e.g., speed, direction, acceleration, etc.), one or more parameters of objects and/or features with which the virtual object interacts (e.g., walls, flippers, blockers, bumpers, etc.), and/or other parameters. The haptic effects may include haptic effects to be provided on portable computing devices that are not currently displaying the virtual object corresponding to the haptic effects. This may enhance the interactivity of the game for a group of users playing the game together on separate portable computing devices.

Another aspect of the invention relates to a system configured to provide haptic effects to a first user of a multi-user application. In one embodiment, the system comprises a first computing platform associated with the first user. The first computing platform comprises a first user interface, a first haptic interface, and a set of one or more processors. The first user interface is configured to receive control inputs from the first user. The first haptic interface is configured to generate haptic effects perceptible to the first user. The first set of one or more processors is configured to execute a first instance of the multi-user application, the multi-user application being configured to interface with an object based on control inputs received from the first user and based on control inputs received from a second user via a second computing platform executing a second instance of the multi-user application. The first set of one or more processors is further configured to determine haptic effects that are to be generated by the first haptic interface, such haptic effects comprising a first haptic effect conveying information to the first user related to a first control input of the second user to the second computing platform.

Still another aspect of the invention relates to a system configured to provide haptic effects to a first user of a multi-user application. In one embodiment, the system comprises a first computing platform associated with the first user and a second computing platform associated with a second user.

The first computing platform comprises a first user interface, a first haptic interface, and a first set of one more processors. The first user interface is configured to receive control inputs from the first user. The first haptic interface is configured to generate haptic effects perceptible to the first user. The first set of one or more processors is configured to execute a first instance of the multi-user application, the multi-user application being configured to interface with an object based on control inputs received from the first user. The first set of one or more processors is further configured to determine haptic effects that are to be generated by the first haptic interface.

The second computing device is in operative communication with the first computing device and comprises a second user interface and a second set of one or more processors. The second user interface is configured to receive control inputs from the second user, the control inputs comprising a first control input. The second set of one or more processors is configured to execute a second instance of the multi-user application, the multi-user application being further configured to interface with the object based on control inputs received from the second user.

The first set of one or more processors is further configured such that responsive to performance of the first control input by the second user the first haptic interface is controlled to generate a first haptic effect conveying information to the first user related to the first control input performed the second user.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
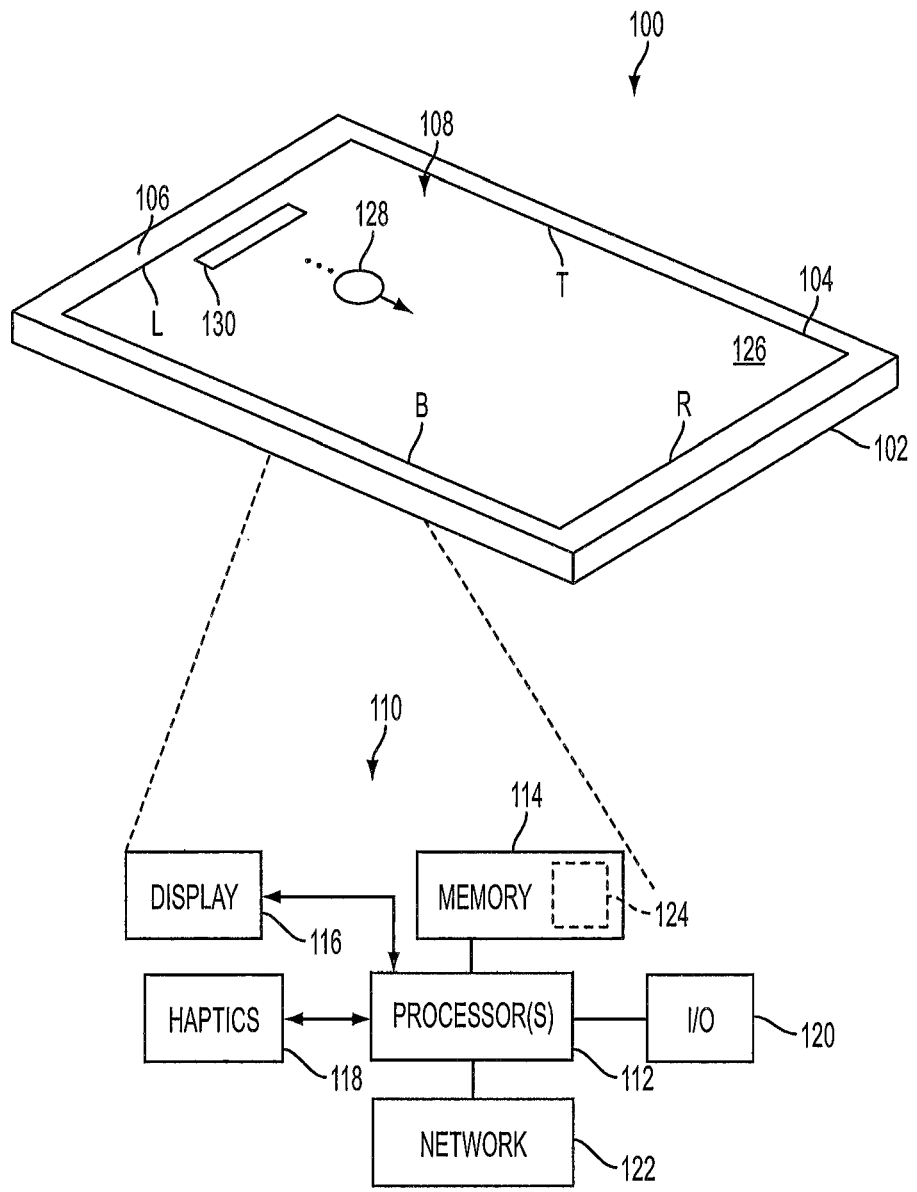
FIG. 1 illustrates a portable computing device, in accordance with one or more embodiments of the invention.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations from what is presented below.

Embodiments of the presently-disclosed subject matter include portable computing devices configured to provide a game in which haptic feedback is provided. Particularly, in some embodiments the game can involve movement of a virtual object in a play area by use of a paddle or other virtual object moved by a user through control gestures. When the virtual object encounters one or more features of the play area, a haptic effect can be selected and played back to one or more of the players of the game via the device interface. The type of haptic of effect can depend on parameters including the feature(s) encountered by the virtual object, while the intensity of the haptic effect can depend on the virtual object's speed and the relative position of the feature(s) to the point or points at which the haptic effect is delivered. For instance, the user may move the paddle by touching and/or performing a gesture at a portion of the screen, and so the haptic effect can be delivered based by determining that position and/or gesture and providing suitable signals to one or more actuators.

By way of non-limiting example, haptic effects may be generated at collisions between virtual objects, and/or to connote other types of interactions between virtual objects. Collisions between virtual objects resulting in the generation of haptic effects may include a moving virtual object colliding with a fixed virtual object (e.g., fixed with respect to a reference frame), multiple moving virtual objects colliding, and/or other collisions. One example of an interaction between objects that could result in the generation of haptic effects would be relative movement between a pair of virtual objects generating virtual friction. The virtual friction could result in the generation of a haptic effect simulating real world friction. In one embodiment, the pair of virtual objects is a moving virtual object and a background or fixed surface along which the mobile virtual object is moving. One example of an interaction between objects resulting in the generation of haptic effects involves a pair of virtual objects, one or both of which are associated with an invisible virtual force. As the virtual objects draw closer together the virtual force(s) interact with the virtual object(s) and/or with each other, resulting in a haptic "hum" effect connoting proximity between the virtual objects.

It will be appreciated that the haptic effects discussed herein are not limited to games such as the one described. These effects may be used for other types of user interface interactions. For example, widgets, icons, windows, grid layouts and other elements of graphical user interfaces are often endowed with virtual physical properties that determine how they interact with each other when a user moves, changes, and/or selects them. The haptic effects described herein can be applied to such elements to augment a graphical user interface by providing an additional mode of feedback. This additional mode of feedback may help the user complete tasks, and/or may provide a more immersive multimodal user experience.

FIG. 1 is a diagram illustrating an example 100 of a portable computing device configured in accordance with one or more aspects of the present invention. Particularly, a tablet computer 102 is shown. Tablet computer 102 includes a screen 104 mounted to a body 106, with the top surface 108 representing a surface with which a user interacts. In this example, top surface 108 is bordered by body 106, but the screen area could extend all the way to the edges of the tablet. Tablet computer 102 can use any number or type of touch-sensing technologies to determine when a user has touched on or near surface 106. For example, surface 108 may include a resistance or capacitance-based touch sensing system and/or an optical touch sensing system. Tablet computer 102 can further use any number or type of gesture-recognition technologies to recognize gestures performed by the user (e.g., while contacting the surface 106) that correspond to control inputs.

Although a tablet computer is shown in this example, it can be understood that any touch-enabled computing device can be used. For instance, a smaller device such as a cellular telephone or media player may feature a touch-enabled display and/or other user interface component(s), and can provide haptic outputs in accordance with the present subject matter. As another example, a haptic ally-enabled display surface associated with and interfaced to another computing device (e.g., a desktop or server computer) can be used. For example, surface 108 may represent a larger touch-enabled surface such as a table upon which a screen image is projected from above or below. A flat surface is depicted here, although the present subject matter could be applied for use in devices with curved surface and/or non-smooth surfaces.

FIG. 1 illustrates an example of the architecture of a computing device 102 at 110. Computing device 102 comprises one or more processors 112 configured to execute computer program modules, a memory 114 such as RAM, ROM, or other memory technology, a display interface 116, a haptic interface 118, I/O interface 120, and network interface 122. Any suitable display technology can be used. In some embodiments, an LCD display is used.

Haptic interface 118 can comprise suitable components for driving one or more actuators used to play back haptic effects so as to provide a physical sensation to a user of device 102. For example, some or all of display 104 may include embedded actuators so that targeted physical output can be provided to a portion of the display to provide a physical effect where the user touches surface 108 and/or performs gestures corresponding to control inputs. Additional actuators may be used to provide haptic output via other surfaces of tablet 102, such as its sides and the surface opposite surface 108 (i.e., the back of the device). Haptic effects can comprise vibrations on a part or the whole of the interactive surface, or deformations to provide kinesthetic or textural effects. It will be appreciated that the location of the actuator relative to the desired physical effect can vary. For example, in order to produce an effect at a first part of the screen, an actuator at a second part of the screen (or elsewhere in the device) may be driven so that the properties of intervening components of the screen and/or device influence what is felt at the first part of the screen.

Haptic can also be provided when a physical object is placed atop the interactive surface. For example, if a glass of water is present on the interactive surface, the interactive surface can provide a pulsing haptic effect which alerts other users who are touching the table that the glass of water is present. Additionally, the virtual physical objects displayed on the interactive surface may be moving around near the glass. If they "collide" with the glass (that is, if they move to a position occupied by the perimeter of the glass), a haptic effect may be played that will represent this collision.

The haptic representation of the collision of virtual objects with real, physical objects placed on the interactive surface can be infinitely extended: it applies to phone screens, tablets, laptops, etc. The physical object can comprise a user's hand or other body part, another device, or an arbitrary object whose size (or other physical properties) are sensed by sensors in or near the interactive surface.

Also, the haptic effects can be played on a mobile phone, computer, or other device placed atop the interactive table. For example, if a phone is placed atop the interactive surface, the processor associated with the interactive surface can determine that a haptic effect should be played by the actuator on the phone. Then it communicates with the phone using some wireless protocol (such as Bluetooth), communicates with a haptic feedback module on the phone, and plays a haptic effect through the phone's actuator.

In one embodiment, the tablet comprises an actuator having an eccentric rotating mass motor. The actuator is coupled either directly or indirectly to a surface of the tablet housing. Powering the motor causes vibration on the surface that a user can feel. By varying the magnitude and frequency of the signal sent to the actuator, various effects are possible. As another example, an actuator may be used to raise or lower sections of the screen to create ridges, troughs, or other features. As a further example, an actuator can comprise a piezoelectric. For example, a piezoelectric actuator can be embedded, at least partially, in an inorganic polymer matrix, such as silicone. As a yet further example, an actuator may comprise a macro-fiber composite actuator or piezocomposite actuator. Such actuators may be formed as a thin layer of piezoelectric fibers suspended in a matrix (e.g., epoxy). The fibers may communicate electrically with polyimide electrodes. Many other types of actuators may be used, and so this exemplary description of actuators is not meant to be limiting.

I/O interface 120 can be used by processor(s) 112 to receive input and provide output using any suitable components. For example, I/O interface 120 may link to speakers and/or a microphone for receiving voice input and providing audio output. As another example, I/O interface 120 may provide a connection to peripheral devices such as a mouse or stylus used to provide input to the device, or to an imaging sensor used to capture still images and/or video.

Network interface 122 can be used to link device 102 to a network using one or more networking technologies. For instance interface 122 may provide a connection to suitable components for connecting to an IEEE 802.11 (Wi-Fi) or 802.16 (WiMAX) network, or a connection using Bluetooth technology. As another example, interface 122 may allow communication via a telephone, Ethernet, or other wired connection or may support other wireless technology such as communication via an IR port.

Computing device 102 can comprise additional components—for example, one or more storage components (e.g., magnetic or solid-state hard disk drives) can be included. If computing device 102 comprises a cellular telephone, appropriate RF components may be included as well.

Memory 114 tangibly embodies one or more program components that configure computing device 102 to operate in an intended manner. For example, memory 114 can include one or more applications, an operating system, and can also include stored data. As illustrated, memory 114 also includes a program component 124 for providing an interactive game in accordance with one or more aspects noted below.

Generally, the game can configure computing device 102 to present a play area 126 via display 104, track the movement of a virtual object 128 (e.g., a ball) in the play area, and respond to user interactions to launch and deflect the virtual object during play using paddle 130. Additionally, the game can be configured to play back haptic effects as the virtual object moves through and encounters features of the play area. The haptic effects can be selected to provide a sensation that differs based on the particular features that are encountered. In this example, play area includes a top T, bottom B, left side L, and right side R. The game can be configured so that the virtual object is deflected by paddle 130 prior to reaching left side L. If multiple players are involved, the virtual object may exit at one or more sides T, B, or R and pass to another user's screen as noted below.

Figure 2A:
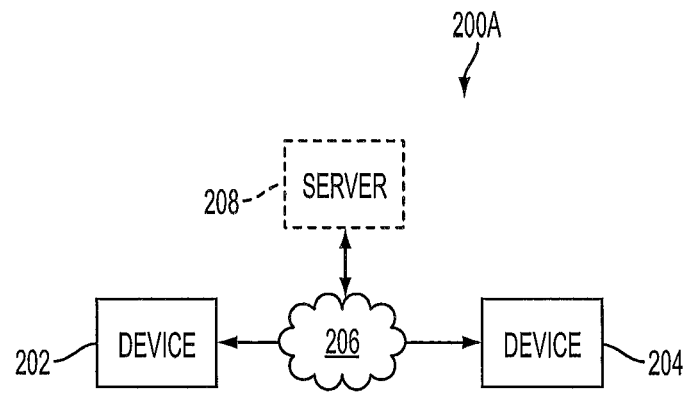
FIG. 2A illustrates an example of the use of a game to support multi-user play, according to one or more embodiments of the invention.

FIG. 2A illustrates an example 200A of the use of a game to support multi-user play. The game program can support sending and receiving data to facilitate tracking the position of the virtual object in a play area that comprises multiple screens. In this example a first device 202 is interfaced to a second device 204 via a network 206. Network 206 may comprise a local area network, a wide area network, or may represent a direct connection between devices 202 and 204. By interfacing multiple devices running an instance of the game, a user can experience haptic effects when the virtual object encounters features in another user's screen. Such haptic effects may include haptic effects determined in accordance with a control gesture input on another user's screen.

For example, if the play area 126 of FIG. 1 is used, then when virtual object 128 exits at right side R of a first device it may enter the screen at right side R of the second device. As another example, the devices may have mirror-image layouts; that is, device 202 may feature paddle 130 along left side L while device 204 includes paddle 130 along right side R. In that case, when the virtual object reaches right side R of the play area of the first device, it may enter the play area at left side L of the other device, headed towards right side R and paddle 130 in the play area of the other device.

Server 208 is depicted to illustrate that in some embodiments, multi-user play may be facilitated by a server. However, as noted above, in some embodiments game program is configured to directly interface with other instances without need of a server.

Figure 2B:
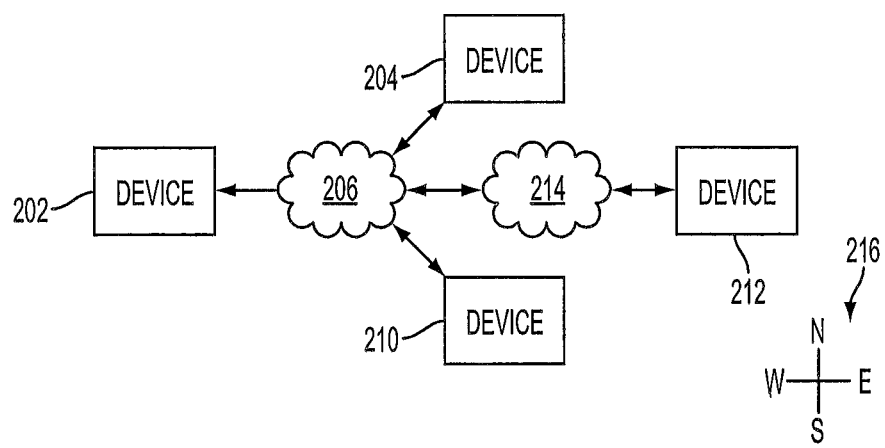
FIG. 2B illustrates an example of the use of a game to support multi-user play, according to one or more embodiments of the invention.

FIG. 2B illustrates another example 200B of a multi-user play. In this example, three devices 202, 204, and 210 are interfaced via a first network 206. A second network 214 facilitates interaction with a fourth device 212. For example, network 206 may comprise a local area network connection while network 214 may comprise a wide-area network connection. Compass 216 is illustrated to show that in some embodiments the relative position of multiple players can be considered. For example, as the "westmost" player, device 202 may include paddle 130 at left side L. Device 204 may have its paddle positioned along top side T, since device 204 is "northmost." Device 210 may have its paddle positioned along bottom side B, while device 212 may have its paddle positioned along right side R. Alternatively, the paddle may remain on the same side of the screen for each user but with appropriate mapping between edges to maintain the relative position of the users around the shared play area.

It will be understood that in various embodiments the game can be configured to dynamically adjust the behavior and connections between the play areas based on factors such as each device's orientation, the relative position of the players, and other considerations such as the relative size of screen areas. As will be noted below, the virtual object can move from one screen to another in other manners in addition to or instead of encountering the boundaries of the play area.

Figure 3:
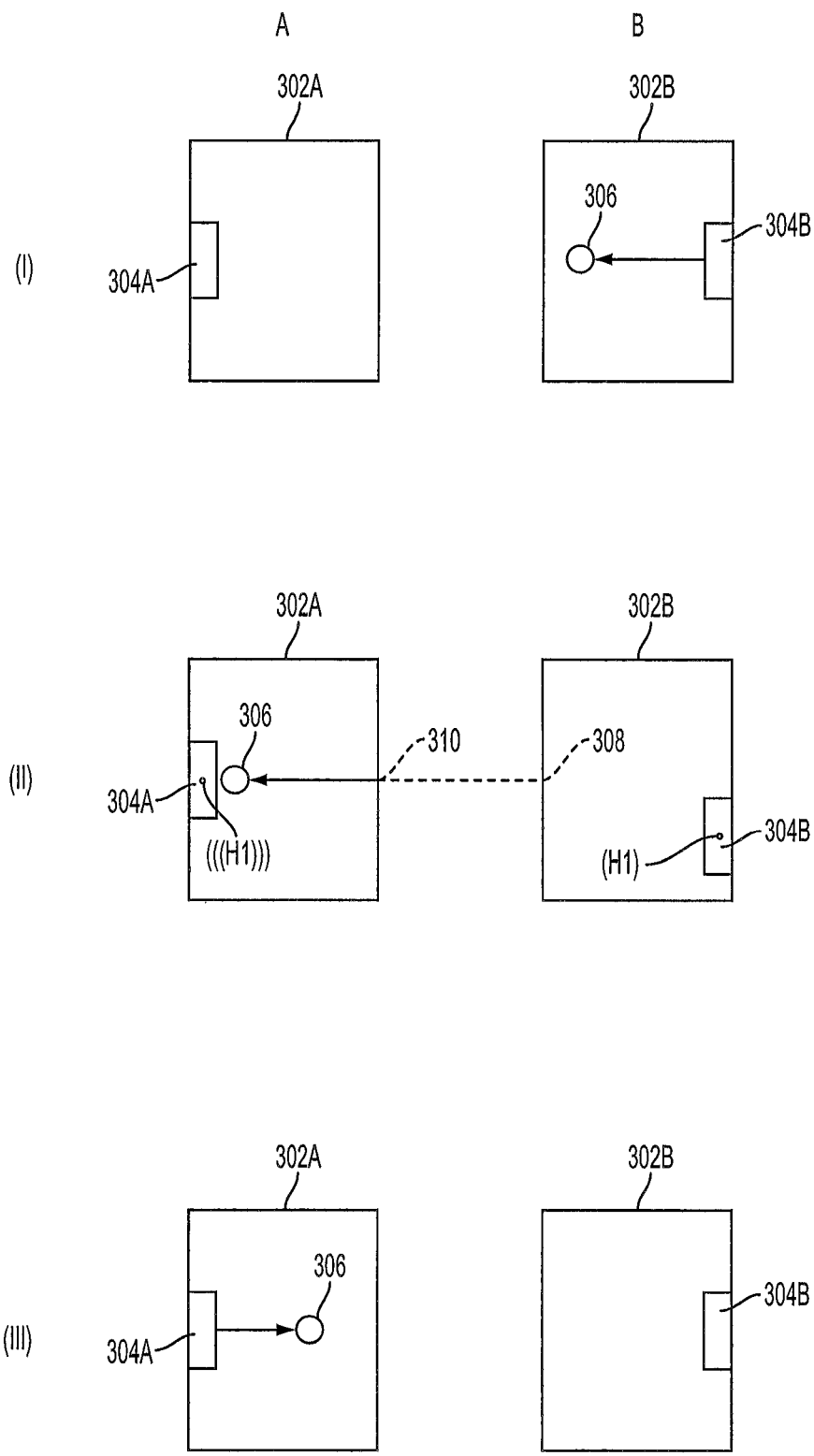
FIG. 3 illustrates an example of play areas for two respective users over a plurality of time intervals, in accordance with one or more embodiments of the invention.

FIG. 3 illustrates an example of play areas 302A and 302B for two respective users A and B over a plurality of time intervals (I), (II), and (III). Each play area 302 includes a respective paddle 304. At time interval (I), virtual object 306 has been launched or deflected from paddle 304B towards the boundary of play area 302B. As shown at time interval (II), exit point 308 from play area 302B is mapped to an entry point 310 in play area 302A. The mapping may allow the virtual object to pass instantly between the play areas or there may be a delay based on the distance between the players (e.g., as determined by GPS and/or other triangulation or proximity detection techniques). In any event, time interval (II) depicts virtual object 306 encountering paddle 304A. For example, user A may have moved paddle 304A by performance of a control gesture. The control gesture may include, for example, sliding his or her fingers along the display surface of his device to intercept virtual object 306.

When virtual object 306 encounters paddle 304A, a haptic effect H1 is selected and played back. As illustrated, haptic effect H1 is localized to the point at which user A touches paddle 304A (and/or another part of play area 302). As was noted above, the sensation can be generated by commanding one or more actuators to provide motion or another effect; the actuators may be located at the point at which the effect is intended to be felt and/or elsewhere. FIG. 3 shows effect H1 as "(((H1)))" in play area 302A and as "(H1)" in play area 302B since the effect is also played back for player B and localized to player B's touch point. However, as indicated the intensity of effect H1 differs as between players A and B.

The haptic effect can be selected based on the simulated physics of the game. For example, the paddles 304 may represent a hard surface, and so effect H1 may comprise a strong, sharp effect. Since a deflection is meant to represent a "hit," effect H1 may be the strongest effect in the game. The "hit" is played back to user B to alert user B that the virtual object will be returned and user B can prepare to deflect the incoming virtual object. The hit may be played back to player B with a suitable indicator of direction—for instance, the effect may be designed to feel like it originated from the left, rather than the top or bottom; this may be helpful when three of more users are playing together.

By playing back the haptic effect even for a collision (or other event or control gesture) occurring in a different player's screen, the game can enhance the perception that the players are sharing a space even though the players cannot view one another's play areas. Thus, the players may become more immersed in the game and may have a more compelling game experience.

They may also receive useful information through the haptic feedback which is used to self-monitor and guide their behavior. The haptic channel may be able to be utilized in such a way as to make the interface or game easier to use; decrease the amount of time needed to learn or skillfully control a new interaction; raise the ceiling of skill that it is possible to develop in a particular interaction; or allow some interactive tasks which normally would require conscious attention to require only subconscious guidance.

Figure 4:
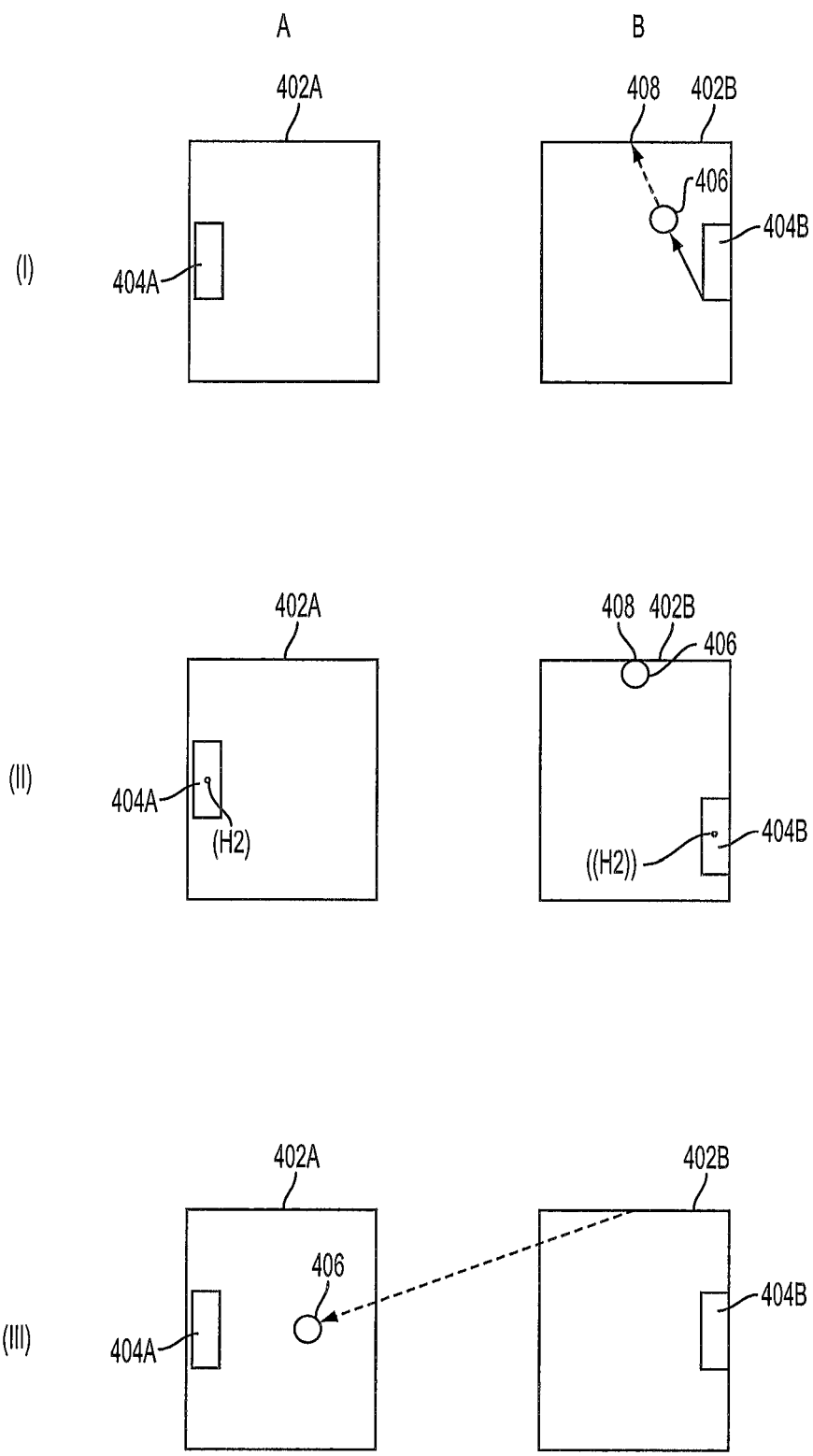
FIG. 4 illustrates an example of play and depicts the virtual object ricocheting off the border of a play area, according to one or more embodiments of the invention.

FIG. 4 illustrates another example of play and depicts the virtual object ricocheting off the border of a play area. Particularly, three time intervals (I), (II), and (III) are again shown. Play areas 402A and 402B correspond to players A and B, while paddles 404 and virtual object 406 are also illustrated. As shown at time interval (I), virtual object 406 is launched with a trajectory towards a point 408 at the top boundary of play area 402. Interval (II) illustrates when virtual object 406 encounters point 408. A "bounce" haptic effect H2 is played back to players A and B, localized to their touch points at respective paddles 404A and 404B.

Since the "bounce" occurs in play area 402B and is at a closer distance to paddle 404B than paddle 404A, it is depicted as "((H2))" in play area 402B and "(H2)" in play area 402A since the bounce is "louder" for player B. As shown at time interval (III), after the bounce the virtual object passes to play area 402A. Alerted to the bounce, player A may attempt to intercept the virtual object through performance of a control gesture and prevent it from reaching the goal area behind paddle 404A.

Figure 5:
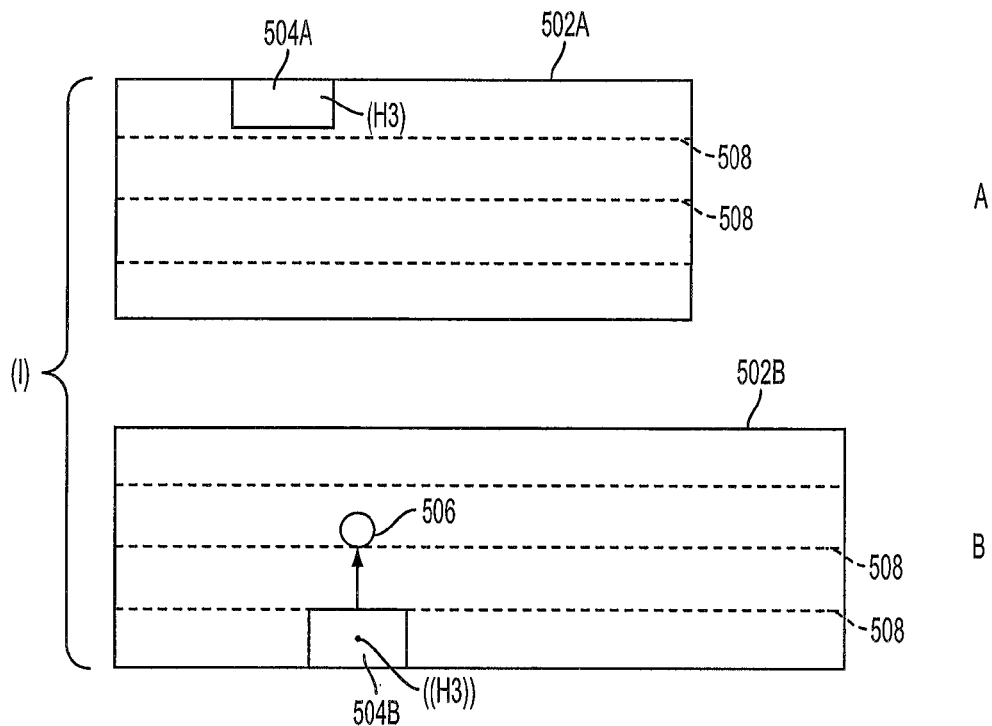
FIG. 5 illustrates a use of haptic effects to simulate a continuous effect, in accordance with one or more embodiments of the invention.
Figure 5:
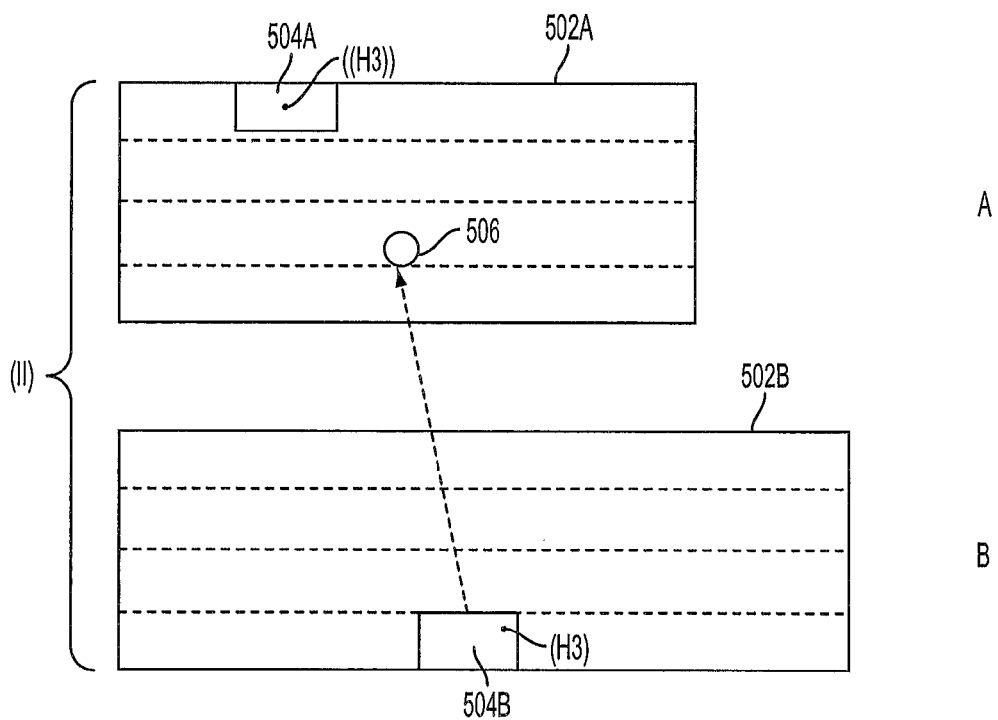

FIG. 5 is a diagram illustrating another aspect of the present subject matter. In addition to or instead of haptic effects played in response to events changing the virtual object trajectory or other "discrete" events, haptic effects can be played back to simulate a continuous effect. In this example, play areas 502 for two players A and B are shown in a time interval (I) and a time interval (II). For purposes of illustration, play areas 502 are shown in a "landscape," rather than "portrait" orientation. Each play area features a respective paddle 504 as well, and virtual object 506 is depicted.

Each play area of this example also includes seams 508 represented by dotted lines. For example, seams 508 may represent boundaries between planks in a wooden surface depicted in the play area. To simulate a wood panel back ground, a continuous low rumble effect to correlate with the virtual object rolling across the surface can be combined with click effects to correlate with the virtual object encountering seams 508. This effect is shown as "H3" in FIG. 5. At time interval (I), the effect is shown as "((H3))" for players B and "(H3)" for player A since the virtual object is closer to paddle 504B than paddle 504A. At time interval (II), effect H3 is louder for paddle 504A since virtual object 506 is moving towards player A. Although the background effect is shown in conjunction with seams 508, a background effect could be included to simulate a surface alone (i.e. a continuous surface) or could vary as the simulated background surface changes (e.g., from a wood area to a metal area to a concrete area, etc.).

Figure 6:
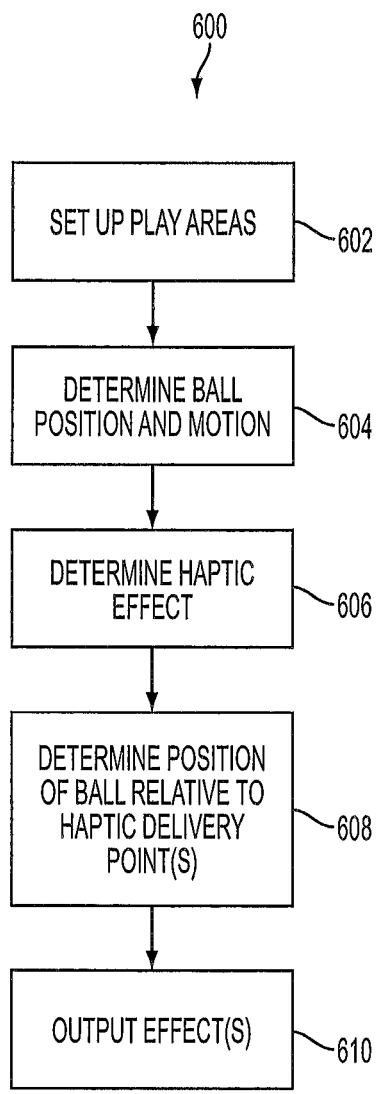
FIG. 6 illustrates a method for providing a game, according to one or more embodiments of the invention.

FIG. 6 is a flowchart illustrating illustrative steps in a method 600 for providing a game in accordance with the present subject matter. Block 602 represents setting up one or more play areas. For example, if two users desire to play, respective play areas can be initialized and mappings between the shared boundaries (and/or other entry-exit points) can be determined.

Block 604 occurs while play continues. At least one instance of the game can track the position and motion of the virtual object based on interaction with paddles, obstacles, and characteristics of the play area based on a model simulating physics of the game. For example, the model can provide for changes in the virtual object's speed and direction based on simulating momentum, mass, and material characteristics of the virtual object and the other items in the play area.

At block 606, based on the position and motion of the virtual object at, before, and/or after an event, one or more haptic effects to play back can be determined. For example, if the virtual object encounters a boundary or other object in the play area, a haptic effect associated with the physical interaction between the virtual object and boundary/object can be selected for playback. Different boundaries/objects may result in different effects. For example, a border or paddle may result in a "hard" effect, while obstacles included in the play area may have "soft" effects. Simulated properties of the virtual object can be taken into account as well—the game may support a mode with a hard (e.g., steel) virtual object or a soft (e.g., rubber) virtual object with appropriate changes in the haptic output scheme.

Additionally or alternatively the haptic effect can relate to a background effect. For instance, as was noted above, a continuous haptic effect simulating passage of the virtual object over a simulated surface can be provided based on characteristics of that surface. As another example, the surface may include material or an obstacle for the virtual object to pass through and a suitable haptic effect can be provided to simulate passage through the material/obstacle.

At block 608, the game determines the position of the virtual object relative to the haptic delivery point(s) to adjust how the haptic effect is to be output. For instance, a haptic delivery point can include the point at which a user touches the screen of a device to perform a control gesture and/or for other purposes. The "haptic magnitude" (i.e., intensity) of the haptic effect can be inversely proportional to the distance between the delivery point and the virtual object. Directionality may also be applied. For example, if a ricochet occurs on another screen, the haptic effect that is presented may include a directional component or may be otherwise be presented to give an indication of where the ricochet occurred.

At block 610, suitable signals are sent to the actuators to generate the haptic effect(s) having the desired volume. For example, the game can consult a library of signal patterns for use in generating different haptic effects and use the signal patterns to command one or more actuators embedded in the screen and/or other portions of the device. The haptic effects may include sounds and/or visual elements as well.

For multi-user play, each respective instance of the game can determine the virtual object's position and motion while in that instance's play area and pass that information to the other instances. When the virtual object exits the play area, information regarding the virtual object's motion (e.g., a vector with direction and speed) can be used to continue tracking by the instance of the game whose play area is to receive the virtual object.

In some embodiments, when an event occurs and/or when background effects are provided, the haptic effect is selected by the instance of the game whose play area contains the virtual object when the haptic effect is to be triggered and that information is provided to the other instances of the game. For example, in a game involving player A and player B, if the virtual object collides with an obstacle, border, or paddle in player A's play area, the instance of the game on player A's device can provide player B's device the desired haptic effect along with information about the collision and position thereof for use by the instance of the game on player B's device in determining a volume or directionality for the effect.

Figure 7:
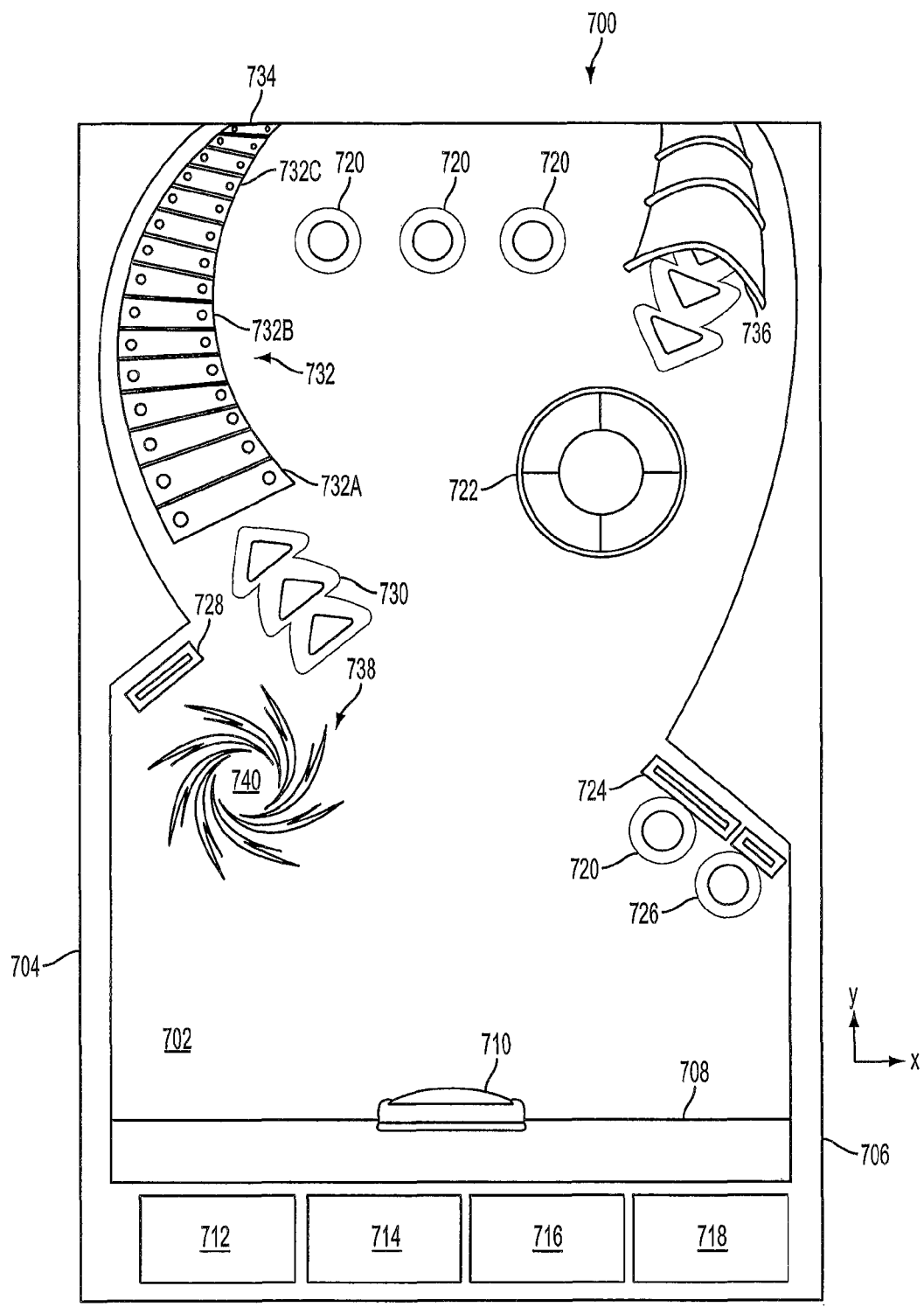
FIG. 7 illustrates an example of an interface for an instance of a game, in accordance with one or more embodiments of the invention.

FIG. 7 is a diagram illustrating an example of an interface 700 for an instance of a game configured in accordance with aspects of the present subject matter. In this example, a pinball-like game is presented in which the play area 702 includes a border 704, 706 that extends inward from the screen boundaries. The objective of the game is to prevent a virtual object (not shown), such as a ball or other object, from reaching 708 by deflecting the virtual object using paddle 710. To begin play, the virtual object may be launched from paddle 710 or may appear elsewhere in play area 702.

Interface 700 includes a plurality of control buttons 712, 714, 716, and 718 which may be used to provide inputs and access menus. For example, buttons 712 and 714 may comprise play and pause buttons, while button 716 provides a "launch" command and button 718 exits the game or launches a menu for configuring, saving, or exiting the game. In some embodiments, control buttons 712-718 may be provided with suitable haptic effects to simulate pushing a physical button.

Turning to play area 702, a plurality of simulated lights 720 can be provided to enhance the visual experience; the lights may or may not act as obstacles. A bumper 722 may cause the virtual object to "bounce" in response to a collision in a manner different from a ricochet from border 704, 706. For example, border 704, 706 may be presented as a simulated metal border which causes a sharp ricochet effect. Bumper 722 may feature an initial amount of "give" before imparting force on the virtual object in a manner similar to that of a pinball machine bumper. Accordingly, when the virtual object encounters border 704, 706 or bumper 722, different respective haptic effects may be played back at the point(s) at which the user contacts the screen to provide different sensations in accordance with the simulated physical response of the borders/bumper. Additionally, as was noted above, the intensity of the effect can depend on distance from the point(s) at which the user contacts the screen.

This example features metal bars 724, 726, and 728, which may provide a still further response to collisions with a virtual object and may be assigned their own respective haptic effect. Arrows 730 may comprise a visual effect and/or may result in an acceleration of the virtual object into xylophone structure 732. In this example, xylophone structure 732 comprises a plurality of keys (732A, 732B, 732C identified), with each ascending key having its own associated haptic effect. For example, as the virtual object moves from key 732A to 732B to 732C, the haptic effect may increase in pitch along with corresponding xylophone sound effects. At the same time, the haptic effect may decrease in intensity as the virtual object moves away.

In some embodiments, point 734 represents an exit from the play area and into a second user's play area, which is identical to play area 702. When the virtual object enters play area 702, it may be returned via chute 736 along with an accompanying "rattle" representing passage through the chute. As was noted above, each haptic effect in one user's play area can also be played back in the other user's (or users') play area(s) but with a corresponding decrease in intensity based on the separation from the site of the event causing the haptic effect and the user's point of contact with the screen.

Some embodiments feature one or more instances of a vortex as shown at 738. Vortex 738 can comprise a portion of play area 702 that attracts the virtual object toward opening 740. If the virtual object reaches opening 740, the virtual object may pass into another play area. When the virtual object initially contacts vortex 738, a first haptic effect representing the "pull" of the vortex may be played back, with the effect becoming stronger until (and if) the virtual object reaches opening 740. At that point, an "exit" effect may be played back to represent the virtual object's exit from the vortex in another play area. This can, for instance, alert the user of the play area receiving the virtual object to move his or her paddle 710 into position.

In some embodiments, if the virtual object is not deflected from goal area 708, a haptic effect representing entry of area 708 is presented, such as absorption of the virtual object or an explosion. At that point, depending upon the rules of the game, the virtual object may be provided for launch again via paddle 710 for another round. In some embodiments, the game proceeds until one player reaches a predetermined score level (e.g., 7 goals) and/or score differential (ahead by 3 goals). As another example, point values may be associated with hitting certain obstacles (e.g., bumper 722, bars 724, 726, 728, lights 720) or passing through all keys of xylophone structure 732. Embodiments may support moving or destroying obstacles (e.g., breaking through bricks) during the course of play, with suitable haptic effects provided based on motion or destruction of the obstacles.

In some embodiments, a computing device may be sensitive to distance of a user's fingers or stylus from the touch screen and/or touch pressure. These features may be used during play of the game and/or in configuring the game application. For instance, if the device indicates that the user is not touching the screen or another haptically-enabled area, and/or performing gestures at such an area, haptic effects can be turned off to reduce power consumption. As another example, the user may be able to perform gestures that are inputs without touching the screen. For instance, the area at which buttons 712-716 are presented may ordinarily appear as brushed metal, but the buttons may appear in response to a user hovering or touching the area, and/or in response to the user performing a gesture at or near the area.

In several examples above, game play proceeded based on control of a paddle exercised through gestures input by a user via a touch interface. Additionally or alternatively, gameplay may depend gestures input and/or perceived via tilt sensors and/or accelerometers. For example, users may be able to tilt or swing their devices to perform gestures that affect the movement of the virtual object and/or paddle position. Haptic effects can be delivered at the point(s) at which the users grip their respective devices. In some embodiments, the game may use multiple paddles per user or may use no paddles at all, with all input based on tilt/acceleration.

Several examples of multi-user play were provided. In some embodiments, single-user play is also supported. For example, a play area may be completely closed, with the virtual object returning towards the paddle and goal area. As another example, single user play may proceed with one or more other players simulated, with the other players having a respective simulated play area and with corresponding haptic feedback when the virtual object enters the simulated play area.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, or in computer hardware, firmware, software, or in combinations of them. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs for providing the haptically-enabled game. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all tangible electronic, optical, magnetic, or other storage or transmission devices capable of providing a processor, such as the processor in a web server, with computer-readable instructions.

Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A first computing platform configured to provide haptic effects for a multi-user application, the first computing platform comprising:
   a display device configured to communicate with a processor;
   a peripheral device configured to communicate with the processor and configured to provide a first control input to the processor;
   a haptic interface configured to generate one or more haptic effects;
   a non-transitory computer-readable medium having computer-executable instructions that, when executed by the processor, causes the processor:
      to execute a first instance of the multi-user application, the multi-user application being configured to control a graphical feature in a virtual space of the multi-user application based on the first control input, wherein the multi-user application is further controlled based on a second control input received by the multi-user application via a second computing platform in communication with the first computing platform and executing a second instance of the multi-user application, and
      to determine a first haptic effect that is to be generated by the haptic interface in response to an event in the virtual space, the first haptic effect being based on a distance in the virtual space between the event and the graphical feature being controlled via the first computing platform.

2. The first computing platform of claim 1, wherein the haptic interface is configured to generate the first haptic effect at a user grip location for the first computing platform.

3. The first computing platform of claim 1, wherein the haptic interface is configured to provide the first haptic effect at a surface of the display device.

4. The first computing platform of claim 1, wherein the execution of the multi-user application by the processor is based on at least one of a tilt gesture and a swing gesture sensed by the first computing platform.

5. The first computing platform of claim 4, wherein the execution of the multi-user application by the processor is based on a signal from at least one of a tilt sensor and an accelerometer.

6. The first computing platform of claim 1, wherein the graphical feature is a first graphical feature, wherein the execution of the multi-user application by the processor is based on a gesture received via the second computing platform to control a second graphical feature in the multi-user application to launch or deflect a virtual object.

7. The first computing platform of claim 6, wherein the computer-executable instructions are configured to cause the first haptic effect to be output while the virtual object is not visible on the display device of the first computing platform.

8. The first computing platform of claim 7, wherein the computer-executable instructions are configured to cause the processor to display on the display device a view of a first portion of the virtual space, and to cause the haptic interface to generate the first haptic effect concurrent with the virtual object being present in a second portion of the virtual space, the second portion of the virtual space being a portion of the virtual space that is not visible on the display device of the first computing platform but is visible on a display device of the second computing platform.

9. The first computing platform of claim 8, wherein the second control input is based is configured to cause the second graphical feature to deflect or launch the virtual object toward the first graphical feature.

10. The first computing platform of claim 9, wherein the computer-executable instructions are configured to cause the haptic interface to generate a second haptic effect that is a continuous haptic effect and that simulates passage of the virtual object over a surface.

11. The first computing platform of claim 1, wherein the processor is configured to wirelessly communicate a signal to the haptic interface that causes the haptic interface to generate the first haptic effect.

12. The first computing platform of claim 1, wherein the event includes a collision between a virtual object in the virtual space and a second graphical feature in the virtual space, and wherein the computer-executable instructions are configured to cause the first haptic effect to be based on a speed, direction, or acceleration of the virtual object.

13. The first computing platform of claim 1, wherein the event is caused by the second control input received via the second computing platform.

14. The first computing platform of claim 1, wherein the graphical feature is a first paddle being controlled by the first control input received via the first computing platform, and the event is a collision between a virtual object and a second paddle being controlled by the second control input received via the second computing platform.

15. The first computing platform of claim 14, wherein the graphical feature is a first graphical feature, wherein the second control input received via the second computing platform controls a second graphical feature in the virtual space, and wherein a distance in the virtual space between the event and the first graphical feature is less than a distance between the event and the second graphical feature, wherein a second haptic effect is generated at the second computing platform in response to the event, and wherein an intensity of the second haptic effect is greater than an intensity of the first haptic effect.

16. The first computing platform of claim 1, wherein an intensity of the first haptic effect is based on the distance in the virtual space between the event and the graphical feature.

17. A system configured to provide haptic effects for a multi-user application, the system comprising:
   a first computing platform comprising:
      a first processor configured to execute a first instance of the multi-user application based on a first control input for controlling a first graphical feature in a virtual space of the multi-user application;
      a first display device configured to communicate with the first processor;
      a first peripheral device configured to communicate with the first processor and configured to provide the first control input to control the first graphical feature;
   a second computing platform comprising:
      a second processor configured to execute a second instance of the multi-user application based on a second control input received via the second computing platform for controlling a second graphical feature in the virtual space of the multi-user application;
      a second display device configured to communicate with the second processor,
   wherein the first processor of the first computing platform is configured to determine the first haptic effect that is to be generated by the first haptic interface in response to an event in the virtual space, wherein the first haptic effect that is to be generated is based on a distance in the virtual space between the event and the first graphical feature being controlled via the first computing platform.

18. The system of claim 17, wherein the second computing platform comprises a second peripheral device configured to communicate with the second processor and configured to provide the second control input to the second processor to control the second graphical feature, and wherein the second processor of the second computing platform is part of a desktop computer or server.

19. The system of claim 18, wherein the second display device and the second processor are part of a touch screen device.

20. A method of providing a first haptic effect at a first computing platform for a multi-user application, the first computing platform comprising a first display device in communication with a processor and comprising a first peripheral device in communication with the processor, the method comprising:

the processor executing a first instance of the multi-user application based on a first control input received via the first computing platform for controlling a graphical feature in a virtual space of the multi-user application, wherein a second instance of the multi-user application is being executed by a second computing platform in communication with the first computing platform;

the processor receiving, via the second computing platform, a second control input received at the second computing platform;

the processor determining the first haptic effect to be generated by the haptic interface of the first computing platform in response to an event in the virtual space, wherein the first haptic effect that is to be generated is based on a distance in the virtual space between the event and the graphical feature being controlled via the first computing platform; and the processor causing the haptic interface to generate the determined first haptic effect.

* * * * *

UNITED STATES PATENT AND TRADEMARK OFFICE
CERTIFICATE OF CORRECTION

| | |
|---|---|
| PATENT NO. | : 9,921,655 B2 |
| APPLICATION NO. | : 15/186688 |
| DATED | : March 20, 2018 |
| INVENTOR(S) | : David M. Birnbaum |

Page 1 of 1

It is certified that error appears in the above-identified patent and that said Letters Patent is hereby corrected as shown below:

In the Claims

Column 14, Line 66 (Claim 17): "the first haptic effect" should be corrected to --a first haptic effect--.

Column 14, Line 67 (Claim 17): "the first haptic interface" should be corrected to --a first haptic interface--.

Signed and Sealed this
Nineteenth Day of June, 2018

Andrei Iancu
*Director of the United States Patent and Trademark Office*